United States Patent [19]

MacDonald et al.

[11] 4,358,695
[45] Nov. 9, 1982

[54] EDDY CURRENT COUPLING HAVING BEARING FLUX SHUNT

[75] Inventors: Daniel J. MacDonald, Brookfield; Thomas H. Jones, Wauwatosa, both of Wis.

[73] Assignee: Litton Industrial Products, Inc., Beverly Hills, Calif.

[21] Appl. No.: 203,060

[22] Filed: Nov. 3, 1980

[51] Int. Cl.³ .......................................... H02K 49/00
[52] U.S. Cl. ....................................... 310/105; 310/90
[58] Field of Search ................... 310/90, 92, 93, 96, 310/97, 101, 103-110, 67, 266, 263, 114, 102, 166, 64

[56] References Cited

U.S. PATENT DOCUMENTS

| | | | |
|---|---|---|---|
| 2,855,527 | 10/1958 | King | 310/105 |
| 3,051,859 | 8/1962 | Farrell | 310/105 |
| 3,184,626 | 5/1965 | Luenberger | 310/96 |
| 3,198,975 | 8/1965 | Fisher | 310/105 |
| 3,214,618 | 10/1965 | Jaeschke | 310/105 |
| 3,283,188 | 11/1966 | Edick | 310/105 |
| 3,372,292 | 3/1968 | Lynch | 310/105 |
| 3,389,279 | 6/1968 | Herrick | 310/105 |
| 3,486,052 | 12/1969 | Jaeschke | 310/105 |
| 3,826,937 | 7/1974 | Davies | 310/105 |
| 3,996,485 | 12/1976 | Jaeschke | 310/103 |

Primary Examiner—R. Skudy
Attorney, Agent, or Firm—Robert A. Seldon

[57] ABSTRACT

An eddy current coupling has telescoping input (12) and output (18) shafts to form a shunt (72, 74, 76) for the magnetic flux (78a) of the coupling around a bearing (66) between the shafts. This avoids the increased friction and heating effects and the magnetization of the bearing occurring when the bearing is exposed to the flux.

6 Claims, 2 Drawing Figures

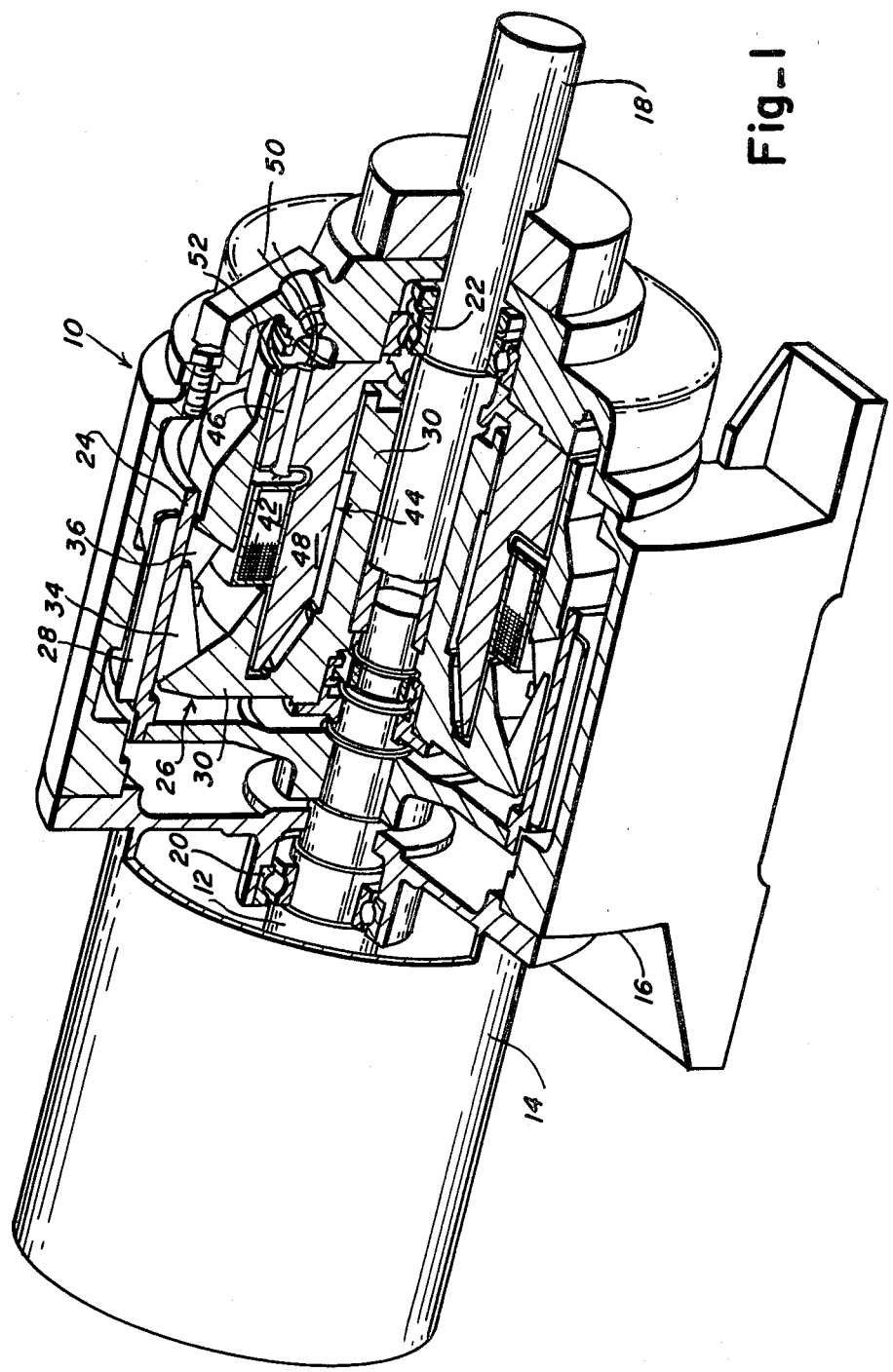
Fig._1

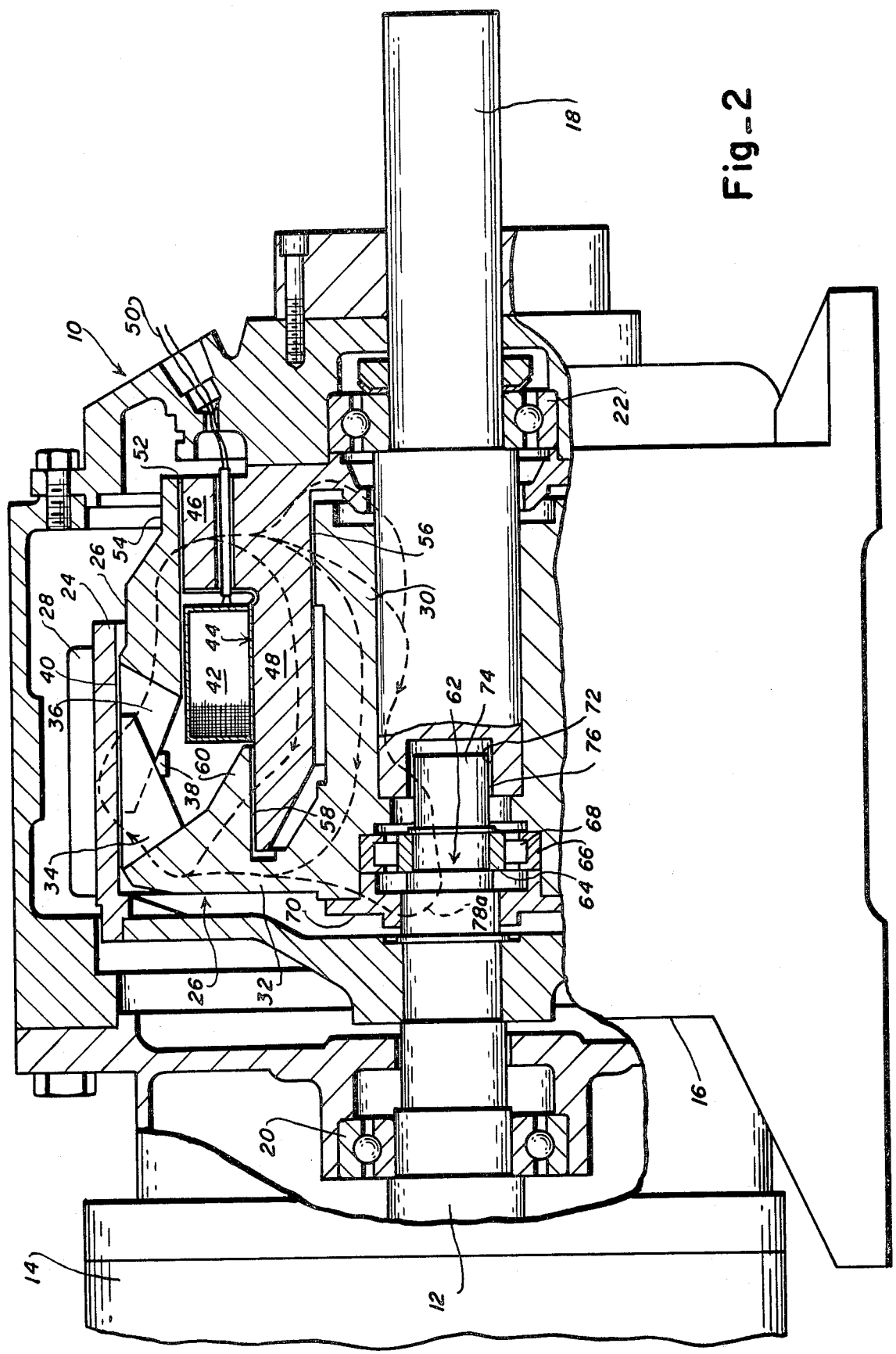

EDDY CURRENT COUPLING HAVING BEARING FLUX SHUNT

DESCRIPTION

1. Technical Field

An eddy current coupling device transmits torque between an input shaft connected to a prime mover and an output shaft connected to the load. Typically, the eddy current device is used to provide variable speed to the load when the prime mover operates at a constant speed, as is true, for example, for an a.c. induction motor.

In an eddy current coupling device, the input shaft typically rotates an inductor drum. A rotor member, commonly referred to as a pole structure, typically comprises a plurality of arcuately spaced poles and is mounted on the output shaft concentric to the inductor drum. The flux of a field coil establishes magnetic poles in the rotor and induces eddy currents in the inductor drum as long as there is a relative speed—i.e. slip—between the rotor and drum. The electromagnetic interaction of the rotor pole flux and the drum eddy currents transmits torque, or turning force. The degree of energization of the field coil determines the amount of torque transmitted between the input and output shafts for a given slip speed condition. A cooling medium, such as air or water, carries off heat generated in the coupling.

2. Background Art

In a commonly used eddy current clutch design, a bearing is provided on the end of the input shaft to journal the output shaft or its associated parts. The bearing is typically of the ball or roller type and provides additional support to the output shaft to enhance its belt loading properties.

However, because of its proximity to the flux carrying portions of the coupling, this bearing is subject to passage of the field coil flux, radially from one of the races through the balls or rollers to the other race. As the balls or rollers rotate through the flux in the bearing, internal eddy currents are generated. The electromagnetic interaction of these eddy currents and the flux establishes a motor action that acts to retard movement of the rolling elements. This causes the rolling elements to skid rather than rotate, increasing friction and wear in the bearing. The resistance heating associated with the eddy currents causes undesirable thermal effects in the bearing. Prolonged exposure to the flux may result in magnetization of the bearing that also produces undesirable effects.

In an effort to avoid the foregoing problems, the bearing has been provided with a bearing cap to bypass the flux around the bearing. While this has lessened flux passage through the bearing, it has also increased the cost of the eddy current clutch device.

DISCLOSURE OF THE INVENTION

It is, therefore, the object of the present invention to provide an eddy current coupling having an effective and inexpensive means for reducing or eliminating magnetic flux through the bearing positioned between the input and output shafts or associated parts of the coupling.

This object is accomplished by providing a recess in one of the shafts for receiving the end of the other of the shafts at a location to one side of the bearing. This shaft structure provides a low reluctance path for the magnetic flux in parallel, i.e. in shunt, with the bearing and to one side of it. The magnetic flux flows in this path in preference to the bearing so that the flux is effectively shunted away from the bearing in an economical manner. A bearing cap or grease cup on one of the shafts or its associated member on the other side of the bearing provides a second low reluctance, shunt path around the bearing.

BRIEF DESCRIPTION OF THE DRAWINGS

FIG. 1 is a partially cut-away, perspective view of an improved eddy current coupling of the present invention.

FIG. 2 is a detailed cross-sectional view taken generally along the line 2—2 of FIG. 1.

BEST MODE FOR CARRYING OUT THE INVENTION

FIG. 1 shows an eddy current coupling device 10. Eddy current coupling device 10 includes input shaft 12. Input shaft 12 is connected to a prime mover such as an a.c. constant speed induction motor 14 bolted to the housing 16 of the coupling device. Output shaft 18, coaxial with input shaft 12, is connected to the load, not shown, that is to be driven at variable speed.

Input shaft 12 is supported by two bearings in the motor, one of which is not shown, the other of which is identified by the reference numeral 20. The output shaft 18 is supported by a bearing 22 mounted in housing 16 and by an additional bearing, hereinafter described.

The magnetic coupling between input shaft 12 and output shaft 18 takes place between an inductor drum 24 and a rotor 26, one of which is mounted on input shaft 12 and the other of which is mounted on output shaft 18.

Because of the considerable heat generated in inductor 24, it is common to utilize the inductor as the exterior member and to mount it on constant speed input shaft 12. As illustrated in FIGS. 1 and 2, inductor drum 24 is a cup-like member of high magnetic permeability and electrical conductivity, the exterior of which is often increased in surface area by the use of fins such as the plurality of cooling fins 28.

Rotor 26 on output shaft 18 includes a collar 30 keyed to output shaft 18. A hub portion 32 extends from collar 30 to a first set of poles 34 mounted on the periphery of rotor 24. The first set 34 and a second set of poles 36, interdigitated with the first set, are mechanically joined to opposite sides of a non-magnetic structure, such as a band 38. Poles sets 34 and 36 are spaced from inductor 20 by circumferential air gap 40.

A field coil 42 is concentrically mounted radially within the rotor 26 on a field coil support 44. The field coil support 44 is generally L-shaped, having a short arm 46 that is fastened to the housing 16 and a longer arm 48 that extends beneath the coil 42. Coil leads 50 extend through arm 46 and housing 16 for energizing the coil.

The arm 46 forms air gap 52 with pole ring 54 that contains second set of poles 36. The arm 44 forms an air gap 56 with the rotor collar 30 and forms an air gap 58 with the flange 60 of hub portion 32. A "J" or "U" shaped coil support bracket could be employed instead of the "L" shaped coil support without departing from the spirit of the invention.

Bearing 62 is mounted between the input and output portions of eddy current coupling device 10. More specifically, inner race 64 of bearing 62 is mounted adjacent the end of input shaft 12. The end of shaft 12 extends beyond bearing 62. Outer race 66 is mounted in hub 32 of rotor 26 fastened to output shaft 18. While bearing 62 is shown in FIG. 2 as containing rollers 68 between the races, it could also contain balls or other rolling elements between the races. Bearing cap or grease cup 70 is fastened to hub 32 and extends along the side of the bearing to a running seal with input shaft 12 to retain the lubricant to bearing 62.

Unless otherwise prevented, bearing 62 provides a path between the shafts for the flux contained therein, leading to the detrimental effects on the bearing noted above.

To reduce or eliminate such flux flow, the present invention provides a low reluctance flux path to shunt the flux around bearing 62. For this purpose, output shaft 18 contains an axial recess 72 at its inner end for receiving the end 74 of input shaft 12 extending beyond bearing 62. The size of the peripheral air gap 76 existing between the interior of recess 72 and the exterior of shaft end 74 and the length of the overlap is selected to maintain the low reluctance properties desired of the flux path.

In operation, field coil 42 is energized with direct current through leads 50 to provide an encircling flux 76 shown by the dotted lines in FIG. 2. Flux 76 passes from one pole set 34 through inductor drum 24, driven by motor 14 to the adjacent rotor pole set 36. The rotation of the drum 24 through flux 76 generates eddy currents in the drum 24. The eddy currents react with the flux to transmit torque from the drum to the rotor 26 and, accordingly, to output shaft 18. The amount of torque that can be transmitted at a given slip speed—(and therefore, at a given output speed)—is determined by the field strength of the field coil 42.

The return path of flux 76 includes arm 46 of coil support 44, arm 48, collar 30, and hub 32. Because output shaft 18 is typically formed of a ferro-magnetic material, such as steel, it also carries a flux, flux 78a. Rather than passing through bearing 62, flux 78a in shaft 18 passes across the low reluctance path between the recess 72 in output shaft 18 and the end 74 of input shaft 12, in parallel with bearing 62. Flux 78a returns to hub 32 through grease cup 70, that may also be formed of ferro-magnetic material. The passage of flux through bearing 62 is thus eliminated or reduced.

The diameter of recess 72 and shaft end 72 may be varied, as can the depth of the recess and length of the shaft end, to insure that the area of the shunting flux path is sufficiently large that no saturation occurs.

While the flux 78 of field coil 72 of eddy current coupling device 10 has been described above, it will be appreciated that motor 14 is also an electromagnetic device and can cause flux to appear in input shaft 12. This flux will be shunted past bearing 62 in the same manner as coupling flux 78a. And, while the end 74 of input shaft 12 is shown as received in a recess 72 of output shaft 18, it will be appreciated that the end of output shaft 18 could be received in a recess in input shaft 12.

We claim:

1. An eddy current coupling comprising:
   coaxial rotatable input and output shaft means positioned in tandem along the axis of said shafts;
   a generally tubular inductor member operatively associated with one of said input and output shaft means for rotation therewith;
   a magnetic rotor member operatively associated with the other of said input and output shafts for rotation therewith and for being electromagnetically coupled to said inductor member;
   a field coil mounted in said coupling for generating a magnetic flux causing electromagnetic coupling and torque transmission between said inductor and rotor members and said input and output shaft means; and
   bearing means interposed between said input and output shaft means,
   one of said input and output shaft means having an axially extending recess for receiving the end of the other of said shaft means for forming a low reluctance flux path between said shaft means in parallel with said bearing means.

2. The coupling according to claim 1 wherein the end of the other of said shaft means extends through and beyond said bearing means and into said recess for forming said low reluctance flux path to one side of said bearing.

3. The coupling according to claims 1 or 2 wherein said output shaft means has said recess and the end of said input shaft means extends into said output shaft means recess.

4. The coupling according to claims 1 or 2 wherein said input shaft means has said recess and the end of said output shaft means extends into said input shaft means recess.

5. The coupling according to claims 1 or 2 wherein said flux path formed in said input and output shaft means lies on one side of the bearing means and a flux carrying element operatively associated with one of said shaft means and forming an air gap with the other of said shaft means lies on the other side of said bearing means.

6. The coupling according to claim 5 wherein said flux carrying element comprises a bearing cap for said bearing means.

* * * * *